United States Patent [19]

Koizumi

[11] Patent Number: 4,913,362
[45] Date of Patent: Apr. 3, 1990

[54] SWING MECHANISM FOR NOZZLE HOLDERS

[75] Inventor: Tetsuro Koizumi, Yokohama, Japan
[73] Assignee: Kamei Machine Project Co., Ltd., Japan
[21] Appl. No.: 134,462
[22] PCT Filed: May 22, 1987
[86] PCT No.: PCT/JP87/00327
§ 371 Date: Dec. 10, 1987
§ 102(e) Date: Dec. 10, 1987
[87] PCT Pub. No.: WO88/05616
PCT Pub. Date: Jul. 28, 1988

[30] Foreign Application Priority Data

Jan. 20, 1987 [JP] Japan .................... 62-09088

[51] Int. Cl.$^4$ .................... H02K 15/85
[52] U.S. Cl. .................... 242/1.1 R
[58] Field of Search ........... 242/1.1 R, 1.1 E, 7.05 B, 242/7.05 C; 29/596, 605, 732

[56] References Cited

U.S. PATENT DOCUMENTS 4,634,063 1/1987 Watanabe .................... 242/1.1 R
4,762,283 8/1988 Sabatino .................... 242/1.1 R Primary Examiner—Katherine A. Matecki
Attorney, Agent, or Firm—Lerner, David, Littenberg, Krumholz & Mentlik

[57] ABSTRACT

A stator winding apparatus has a spindle which is rotated by a driving source. A center tube is fixedly coupled to the spindle for rotation therewith. A slope cam having a slot transverse to the center tube is mounted about the center tube in pressure contact with a concave cam. Also mounted about the center tube in slidable engagement with the slope cam is a cone which moves longitudinally along the center tube as the slope cam is transversely displaced. A plurality of nozzle holders, each of which carries a nozzle at an upper end thereof, are pivotably connected to a support member which, in turn, is fixedly connected to the center tube. Arranged between the support member and the cone is a spring which biases the cone away from the support member. As the slope cam is transversely displaced, the cone is driven upwards, simultaneously forcing the lower portions of the nozzle holders outward. As a result, the nozzles are driven in a synchronized manner to assure uniform lengths of wire are delivered between the magnetic poles of the stator.

6 Claims, 3 Drawing Sheets

SWING MECHANISM FOR NOZZLE HOLDERS

FIELD OF THE INVENTION

The present invention relates to wire winding on a stator, and in particular to means for causing synchronized movement of a plurality of wire winding nozzles held by nozzle holders on a stator winder equipped with a concave cam.

BACKGROUND OF THE INVENTION

In one conventional stator winding system, a plurality of nozzle holders are driven for movement by the rotation of a heart-shaped cam. Since no synchronized movement of the nozzles is obtained in this system, the delivery of lead wires and lengths of wire between the magnetic poles is not uniform. As a result, additional adjustment is required after the magnetic poles are wound. Furthermore, with such stator winders, adjustment in the nozzle stroke is required every time the size of the heart-shaped cam is changed.

SUMMARY OF THE INVENTION

In accordance with the present invention, a slope cam in pressure contact with a concave cam is slidably coupled to a cone. Nozzle holders for wire winding nozzles are held by a support member in contact with the inclined face of the cone. A center tube coupled to the support member passes through the slope cam and the cone. Through the action of the concave cam on the slope cam, the nozzle holders are driven for synchronized movement in order to assure a uniform length of lead wires between magnetic poles.

DETAILED DESCRIPTION

Figure 1:
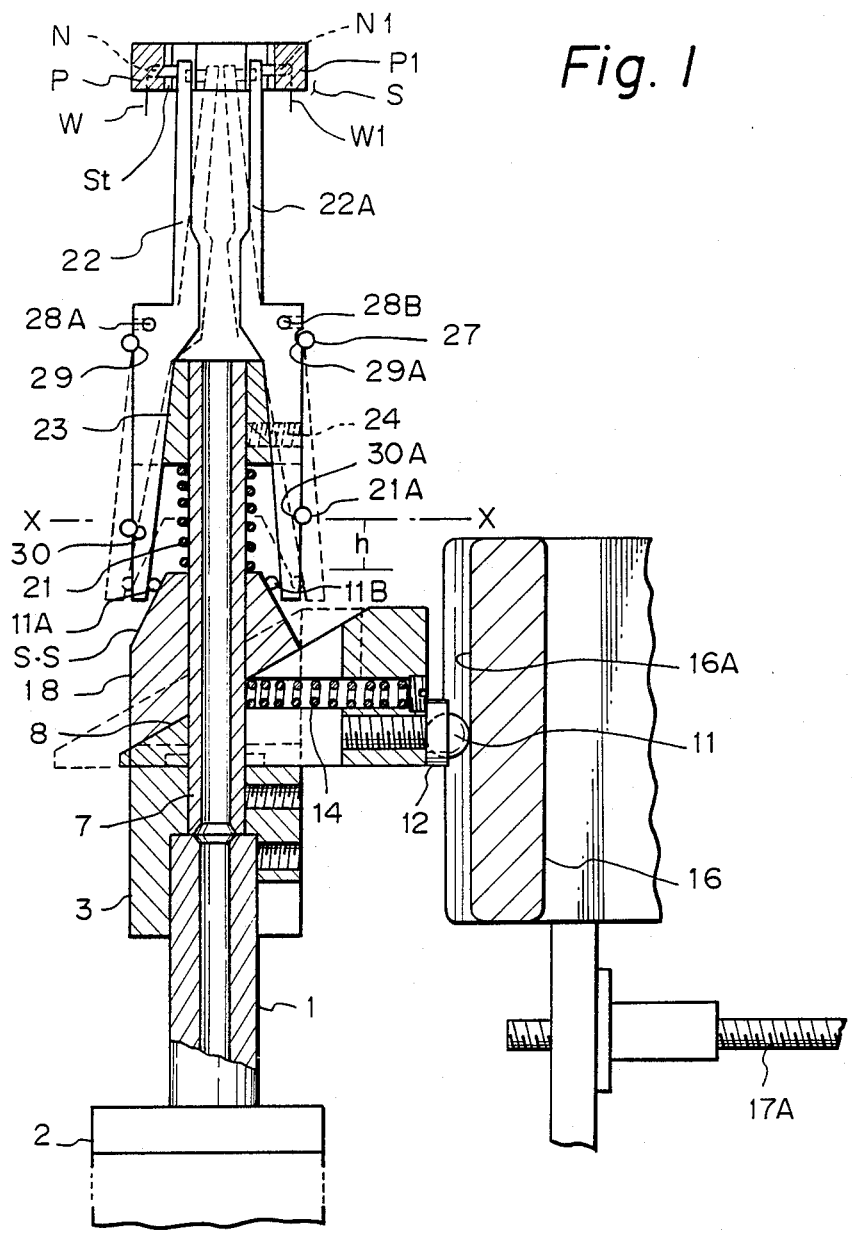
FIG. 1 is a sectional view of the main part of the swing mechanism in accordance with the present invention.
Figure 2:
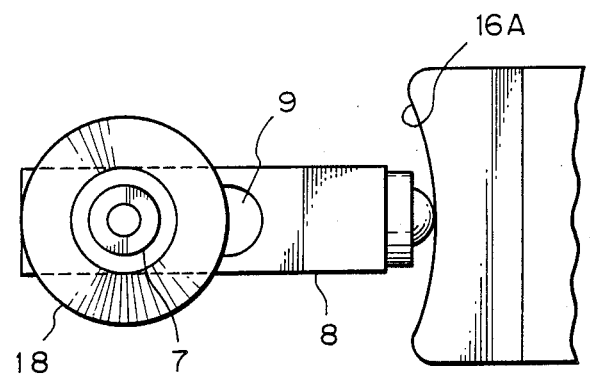
FIG. 2 is a plan view taken along line X—X in FIG. 1.
Figure 3:
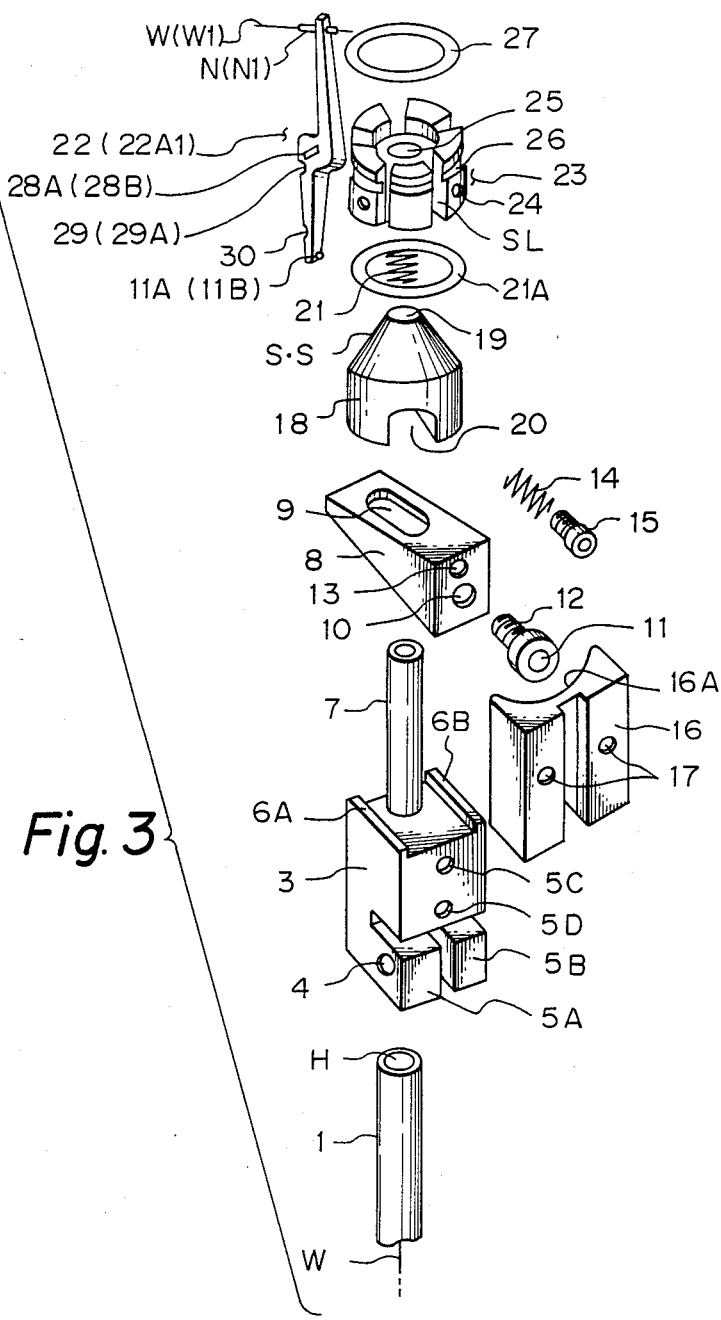
FIG. 3 is perspective view showing the mechanism of FIG. 1 in a disassembled state.

As shown in FIGS. 1 and 3, spindle 1 is coupled to a driving source 2 for rotation. The spindle 1 is inserted into the underside of connector 3 and clamped in position between fastener pieces 5A and 5B by the use of an appropriate bolt (not shown) inserted into a bore 4. A bore 5D is formed in the connector 3 above the fastener pieces 5A and 5B for fixed coupling of the connector 3 with the spindle 1. Guides 6A and 6B project upwardly from lateral ends of the upper face of the connector 3, and a center tube 7 is arranged upright between the guides 6A and 6B in communication with the bore H of spindle 1. A bore 5C is formed in the connector 3 above the bore 5D for fixed coupling of the connector 3 with the center tube 7. The center tube 7 extends through a slot 9 in a slope cam 8 so that the slope cam 8 is slidable about the center tube 7 in the space between the guides 6A and 6B. A threaded bore 10 in the slope cam 8 is sized and shaped to receive a screw 12 having a ball 11 in the head thereof. A bore 13 in slide cam 8 receives a fastener screw 15 which applies pressure to the center tube 7 via a coil spring 14. A concave cam 16 is properly supported via bores 17 formed in its side face. A ball screw 17A is coupled to the concave cam 16 for reciprocal movement of the concave cam 16. A hollow face 16A formed in the concave cam 16 is in pressure contact with the ball 11 on the screw 12.

A cone 18 having an axial center bore 19 is positioned about center tube 7. An inclined cutout 20 is formed in the lower part of the cone 18 in communication with the center bore 19. As the slope cam 8 is urged to reciprocate in the inclined cutout 20 by the concave cam 16, the cone 18 is driven for movement in the longitudinal direction along the center tube 7. A coil spring 21 placed on the cone 18 about the center bore 19 is inserted into the underside of a support member 23. Support member 23 is made up of a plurality of units for coupling a plurality of nozzle holders 22A, only one such nozzle holder being shown in FIG. 3. The support member 23 is provided with an axial center bore 24 to receive the center tube 7, and is fixedly mounted to center tube 7 via radial bores 24. An annular groove 26 is formed in the upper part of the outer face of the support member 23 to receive a ring spring 27 as described below.

Nozzles, such as N and N1, are held in position by nozzle holders, such as 22 and 22A. As seen in FIG. 1, wires W and W1 run through the nozzles N and N1 and the bore H of the spindle 1 in order to wind a stator S. Pins 28A and 28B, arranged in slits SL in the support member 23, serve as the centers of the swing motion for winding. The nozzle holders also include upper cutouts, such as 29 and 29A, and lower cutouts, such as 30 and 30A, the purpose of which will be described more fully below.

In assembling the swing mechanism, the spindle 1 on the driving source 2 is fixedly coupled to the connector 3 via fastener pieces 5A and 5B and bore 5D. The center tube 7 is fixedly connected at one end to the connector 3 via bore 5C. The slope cam 8 is assembled about center tube 7 for sliding engagement between upwardly projecting guides 6A and 6B on connector 3. Cone 18 is then assembled for sliding engagement with center tube 7 so that inclined surface 20 is in communication with the inclined surface of slope cam 8. Coil spring 21 is then mounted about center tube 7 above cone 18, and support member 23 is fixedly connected to center tube 7 via radial bores 24. The coil spring 14 is inserted into bore 13 in slope cam 8, and is brought into pressure contact with the center tube 7 by adjustment of fastener screw 15. By assembling screw 12 into the bore 10 in slope cam 8, ball 11 is positioned to contact the hollow face 16A of the concave cam 16.

Pins 28A and 28B attach the nozzle holders 22 and 22A between the slits SL of the support member 23. Coil spring 21A is then assembled about the lower cutouts 30 and 30A in nozzle holders 22 and 22A in order to apply inward pressure to the lower portion of the nozzle holders 22 and 22A. Contact balls 11A and 11B, rotatably mounted to the lower ends of the nozzle holders 22 and 22A, are brought into contact with the face S.S of the cone 18. The ring spring 27 is then assembled about the upper cutouts 29 and 29A of the nozzle holders 22 and 22A and the annular groove 26 in order to hold the nozzle holders 22 and 22A against the support member 23.

In the swing mechanism in accordance with the present invention, turning the ball screw 17A causes the concave cam 16 to apply pressure to slope cam 8 via the ball 11 as it contacts the hollow face 16A of the concave cam 16. As a result, the slope cam 8 is displaced in a direction transverse to the center tube 7 as shown by the dashed lines of FIG. 1, and the cone 18 is pushed longitudinally along the center tube 7 toward support member 23 in a corresponding amount due to its sliding contact with the slope cam 8. As the cone 18 is forced longitudinally, the lower portions of the nozzle holders 22 and 22A are forced outwardly along an arcuate path, causing the nozzles N and N1 to move inwardly along an opposite arcuate path into a slit St between magnetic poles P and P1 of the stator S. This arcuate path includes a small component in the longitudinal direction and a large component in the radial direction with respect to center tube 7, the result of the pivoting action of the nozzle holders 22 and 22A about pins 28A and 28B. Next, driving source 2 rotates the spindle 1 so that wires W and W1, as shown in FIG. 3, are advanced through the bore H of the spindle 1 to the nozzles N and N1 and delivered therefrom to be wound along oblong loci about the magnetic poles P and P1.

In accordance with the present invention, the inward and outward movement of the bottom portion of a plurality of nozzle holders 22 and 22A via the longitudinal movement of cone 18 drives the nozzles N and N1 for similar arcuate movement. The corresponding longitudinal and radial components of this arcuate movement are substantially similar for the nozzle holders 22 and 22A, thereby enabling nozzle N and N1 to repeatably move in a synchronized manner. Further, adjustment in the stroke of the nozzles N and N1 can be easily achieved by changing the degree to which ball screw 17A is turned.

I claim:

1. A stator winding apparatus comprising:
   a spindle operatively coupled to a driving source for rotation therewith,
   a connector fixedly coupled to said spindle, said connector including a center rube projecting from said connector for rotation with said spindle,
   a wedge-shaped slope cam having a transverse slot for accommodating said center tube and assembled for slidable displacement in a direction transverse to said center tube, said slope cam further having cam follower means projecting from one end thereof,
   a concave cam disposed in pressure contact with said cam follower means,
   a cone having an outer inclined face slidably assembled about said center tube in operative engagement with said slope cam, said cone being longitudinally slidable along said center tube in response to said slidable displacement of said slope cam,
   a support member fixedly connected to an end of said center tube distal from said connector for rotation with said center tube,
   spring means arranged between said support member and said cone for biasing said cone away from said support member,
   a plurality of nozzle holders pivotally coupled to said support member in operative engagement with said inclined face of said cone whereby said longitudinal slidable movement of said cone causes corresponding pivoting of said plurality of nozzle holders, and
   means for holding said nozzle holders in assembled position on said support member.

2. The stator winding apparatus according to claim 1 wherein said connector includes a pair of guide members for guiding said slidable displacement of said slope cam.

3. The stator winding apparatus as claimed in claim 1 wherein said cone has an inclined bottom surface for sliding engagement with said slope cam.

4. The stator winding apparatus as claimed in claim 1 wherein said cam follower means comprises a spherical ball projecting radially from one end of said slope came.

5. The stator winding apparatus as claimed in claim 1 wherein said nozzle holders include spherical elements for operative engagement with said outer inclined face of said cone.

6. The stator winding apparatus as claimed in claim 1 wherein said plurality of nozzle holders include an upper end and a lower end in contact with said inclined face of said cone, said apparatus further comprising resilient means disposed about said lower portion of said plurality of nozzle holders for biasing said lower portion of said plurality of nozzle holders toward said center tube.

* * * * *

UNITED STATES PATENT AND TRADEMARK OFFICE
CERTIFICATE OF CORRECTION

PATENT NO. : 4,913,362

DATED : April 3, 1990

INVENTOR(S) : Koizumi

It is certified that error appears in the above-identified patent and that said Letters Patent is hereby corrected as shown below:

Claim 1, line 36, "rube" should read --tube--.

Claim 4, line 31, "came" should read --cam--.

Signed and Sealed this

Twenty-eighth Day of May, 1991

Attest:

HARRY F. MANBECK, JR.

*Attesting Officer*   *Commissioner of Patents and Trademarks*